United States Patent [19]
Buttone et al.

[11] 3,854,513
[45] Dec. 17, 1974

[54] INTERNAL WHEEL SAFETY DEVICE FOR VEHICLES

[76] Inventors: Valsin J. Buttone, 8445 Fairfax Dr., Chalmette, La. 70043; Larry J. Buttone, 4428 Reich St., Metairie, La. 70002

[22] Filed: Oct. 17, 1973

[21] Appl. No.: 407,057

[52] U.S. Cl. .............................................. 152/158
[51] Int. Cl. ............................................ B60c 17/04
[58] Field of Search .................... 152/158; 301/39 T

[56] References Cited
UNITED STATES PATENTS

| | | | |
|---|---|---|---|
| 3,420,288 | 1/1969 | Unruh | 152/158 |
| 3,519,053 | 7/1970 | Lindley | 152/158 |
| 3,550,664 | 12/1970 | Lee | 152/158 |
| 3,645,312 | 2/1972 | Kolodziej | 152/158 |
| 3,777,798 | 12/1973 | Marquis | 152/158 |

*Primary Examiner*—Drayton E. Hoffman
*Attorney, Agent, or Firm*—Cushman, Darby & Cushman

[57] ABSTRACT

An internal safety wheel for mounting inside the tire of a vehicle wheel is provided having a plurality of arcuate spacer segments that are adapted to encircle a wheel rim with the spacer segments being secured by a plurality of band members. The band members form a surface on which the wheel rim may be supported if the tire reaches a deflated condition so that damage to the tire or the vehicle occupants is avoided.

6 Claims, 2 Drawing Figures

PATENTED DEC 17 1974  3,854,513

INTERNAL WHEEL SAFETY DEVICE FOR VEHICLES

BACKGROUND OF THE INVENTION

This invention relates to a safety device and, more particularly, an internal wheel safety device that is adapted to fit around the periphery of the wheel rim.

The safety device disclosed may be advantageously secured around the rim of a vehicle wheel while being located internally of the wheel tire. It is contemplated that the safety device will be used in conjunction with a tubeless tire, as is common today on many automotive vehicles. However, the safety device is not to be limited to use on automobiles exclusively. The safety device could be adapted to other vehicles, such as aircraft, trucks, trailers, and even to wheeled implements of husbandry.

Although pneumatic tubeless tires of today have many advanced safety features, these tires, of course, are not infallible to becoming deflated. If such a tire is to be used on an automobile, for example, it is well known that a driver of an automobile may encounter hazardous objects during a journey. These hazardous road objects can puncture the tires whereby the tire can loose air either rapidly or slowly depending upon the size of the puncture. If the automobile is travelling at a high rate of speed and if the puncture is severe enough to cause a rapid deflation of the tire, the automobile may swerve to the side of the debilitated tire, resulting in an accident which could cause injury or death to the occupants and injury to other automobiles and property. If, however, some type of internal safety wheel is located around the rim of each one of the wheels, the safety device will support the rim off of the ground and provide a balanced albeit rough ride enabling the driver to retain control of his automobile. Also, because the rim is supported off of the ground, both the rim and tire remain relatively undamaged.

Internal vehicle safety wheels are well known in the prior art but unfortunately have practical drawbacks. In U.S. Pat. No. 3,645,312, as automobile tire inner suppport is disclosed. However, this internal support device is supported inside a groove that is built into a wheel rim. Such a grooved wheel rim, of course, would not be a standard production item and would be reflected in higher cost to automobile or other vehicle owners. The instant invention has as an advantage a utilization of a standard vehicle wheel rim without any modifications to the wheel rim whatsoever. In U.S. Pat. No. 3,528,472, a safety device for automobile wheels is described in which a plurality of segments fitting around the wheel rim are connected by means of turnbuckles, and the segments are in turn bolted to the rim. The segments are constructed of steel which, of course, is quite expensive. A further example of an internal safety wheel for vehicles is disclosed in U.S. Pat. No. 3,420,288. This patent discloses two segments encircling the wheel rim. These segments are also constructed of steel in the form of an arcuate I beam, wherein the segments are joined at their respective ends by a latching means. As set forth in the detailed description of the invention, the present or instant invention utilizes plywood segments secured together by steel pins and steel outer band members. Such plywood segments could, of course, be economically and rapidly made. A last prior art patent considered to be relevant is U.S. Pat. No. 2,775,282 in which the inner wheel safety device is once again bolted to the wheel rim and is constructed of steel. As can be seen from the above, while the prior art discloses internal wheel safety devices, all have the distinct disadvantages of being secured through bolts or otherwise to the wheel rim and of being constructed of steel. The present novel invention, while achieving a practical safety device, does not necessitate the use of expensive materials or the modification of the wheel rim.

SUMMARY OF THE INVENTION

An object of the invention is to provide a vehicle wheel safety device which insures that a tire and rim will not be damaged if the tire reaches a deflated condition while the vehicle is travelling.

Another object of the invention is to provide a safety device that enables the vehicle to be operated safely if a tire becomes deflated, by supporting the rim off the surface over which the vehicle is travelling.

Yet another object of the invention is to provide a vehicle wheel safety device that can be easily assembled in a short period of time using a minimum number of parts and tools.

Still another object of the invention is to provide safety devices constructed of inexpensive parts that can be readily procured. These parts are contemplated to be constructed from inexpensive steel bands and from commonly available plywood sheets.

Still another object of the instant invention is to provide an internal wheel wherein the use of said internal wheel requires no modification to the wheel rim in order for the safety device to be effective.

A further object of the present invention is to provide an internal wheel safety device that has a high degree of structural integrity and that can be readily adapted to a vehicle. The safety device, as pointed out earlier, is also proposed for use in small aircraft which travel across the ground surface at high rates of speed preparatory to take-off and landing. Agricultural vehicles which travel over rough ground are also considered a subject for the use of the internal wheel safety device.

Additional objects of the present invention reside in the specific construction of the exemplary apparatus hereinafter particularly described in the specification and shown in the drawings.

BRIEF DESCRIPTION OF THE DRAWINGS

Novel features of the improved safety device in accordance with the present invention will be more readily understood from a consideration of the following description taken together with the accompanying drawings in which certain preferred adaptations are illustrated with the various parts thereof identified by suitable reference characters in each of the views.

FIG. 2 shows the tire placed on the rim and the relationship of the safety device to the tire and rim.

DETAILED DESCRIPTION OF THE INVENTION

Figure 1:
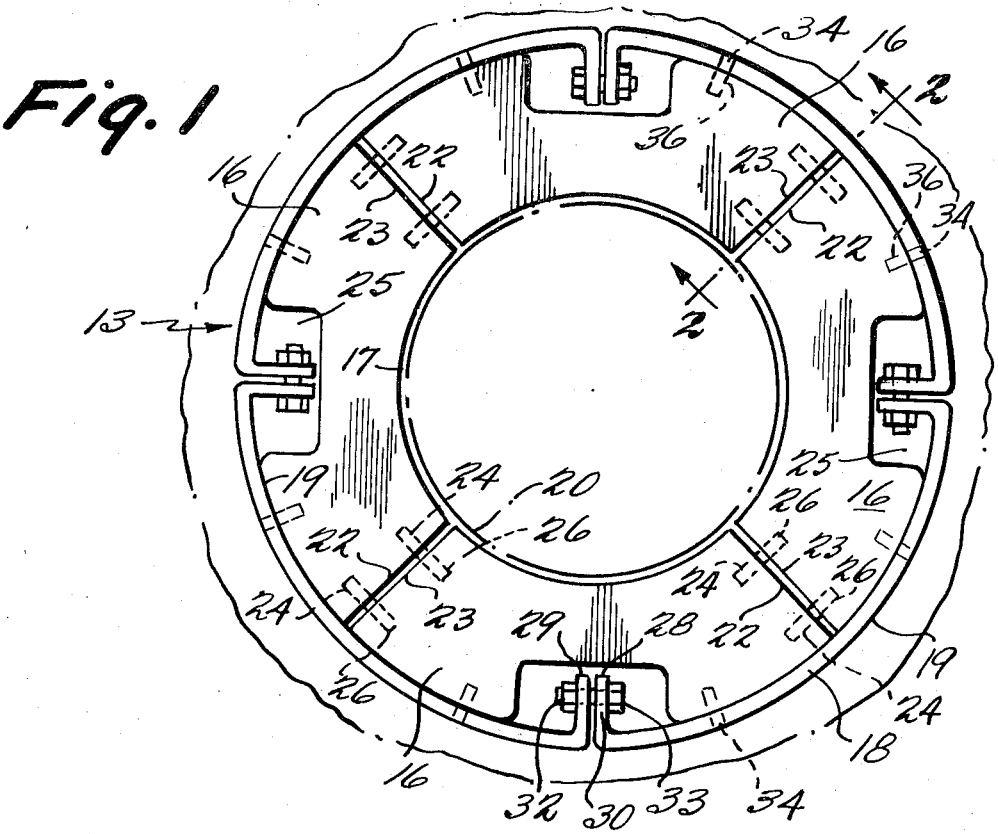
FIG. 1 is a plan view of the internal wheel safety device. The tire is not illustrated in this view.
Figure 2:
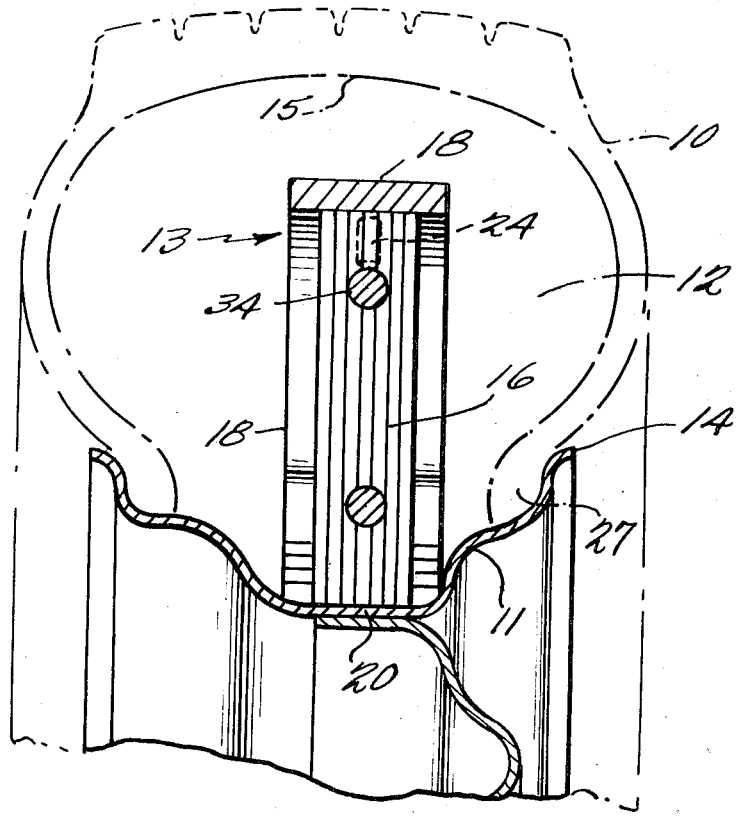
FIG. 2 is a section taken along line 2 of FIG. 1.

Referring now to FIGS. 1 and 2, there is graphically illustrated the preferred embodiment of the invention. A conventional tubeless tire 10 is mounted on a wheel rim 11, and disposed in the air space 12 of the tire 10 is the wheel safety device, generally designated at 13. The preferred embodiment utilizes four identical arcuate spacer segments 16 and four identical outer arcuate band members 18; the members 18 are adapted to secure the spacer segments 16 to fit around the inner radius 20 of the rim 11. Each arcuate segment 16 has an inner periphery 17 and an outer periphery 19.

The segments 16 could advantageously be constructed of plywood; for instance, 1 ¼ inches thick 7 ply hardwood has been found to offer sufficient strength and yet be most economical. After the proper dimensions for a particular rim and tire have been ascertained, segments 16 adapted to conform to these dimensions could easily be cut from a sheet of plywood using a conventional band saw. Each of the segments 16 has a recess 25 disposed intermediate of the ends 22 and 23 of the segments. In the preferred embodiment, each segment 16 has located at its one end 22 two dowel pins 24. These pins 24 are contemplated as being ½ inch in diameter by 2 inches long steel guide pins and are buried or cemented up to one-half their length into the segment 16 at the end 22. The other half of each of the pins 24 extends outwardly and is disposed to form a snug fit in the corresponding bored holes 26 located in the end 23 of the next adjoining segment 16. From the above, it can be seen that each segment 16 is identical, having pins 24 on one end 22, and having appropriately bored holes 26 for receiving pins 24 on the other of said ends 23.

The outer band members 18 are preferably constructed of ⅜ inch thick by 2 inches wide steel band. Each member 18 has its opposite ends bent inwardly to form flanges 28 and 29. These flanges 28 and 29 are constructed in a manner such that when the safety device is fully assembled onto the rim 20, the flanges 28 and 29 will protrude into the recesses 25. Each flange 28 will abut against the flange 29 of the opposing segment and the flanges 28 and 29 are also provided with bores 30 adapted to receive a fastening means which typically would be a steel bolt 32 and nut 33. The bolts 32 would lie in a plane parallel to the plane of the segments 16.

Each band member 18 also is equipped with preferably two ⅜ inch diameter by ⅞ inch long steel pins 34. The pins 34 are welded or otherwise adequately secured to the member 18 and extend radially inward and are adapted to fit into bores 36 which have been drilled into the segments 16. The pins 36 and bores 34 offer a convenient guide for assembling the band members 18 to the segments 16, and also keep the members 18 from inadvertently slipping off or sliding around the outer periphery 19 of the segments 16.

From the above, it can be seen that the preferred embodiment envisages the use of plywood spacer segments 16 and an outer steel band member 18 with steel pin means 24 and 34. However, it is entirely within the scope of the invention that other materials could readily be substituted into the above exemplary embodiment.

The method of inserting the safety device will now be fully described. The tire 10 is deflated and has one of its inner beads 27 disposed outside of the outer lip 14 of the rim 11. The segments 16 are in four separate pieces and are inserted into the interior air space 12, such that the inner peripheries 17 are in proximity to the inner radius 20 of the rim 12. Care must be taken to see that the segments 16 have the proper end alignment; that is, end 22 of one segment 16 must be placed next to end 23 of the adjacent segment, so that a person can manually insert the pins 24 into the bores 26. Once all of the pins 24 have been fully inserted into the bores 26, the inner periphery 17 of the segments 16 will fit relatively tightly against the rim radius 20. The steel band members may now be inserted into the space 12, with the guide pins 34 and bores 36 in the segments 16 insuring virtually accurate assemblage. When all four of the members 18 have so been placed, bolts 32 may be inserted into the flange bores 30, and secured by the nuts 33. As the nuts 33 are tightened using a conventional wrench means, the members 18 draw the segments 16 in against the inner rim at 20. This will provide for an adequately tight fit, but if the segments 16 tend to rotate about the rim, the safety device is in no way impaired from performing its function.

After the safety device has been fully assembled and secured, the bead 27 of the tire is forced back inside of the outer lip 14 by use of conventional tire mounting methods, well known to gas station attendants. The tire is then inflated with the proper air pressure and the wheel assemblage is mounted onto the vehicle. The outer periphery of the band member preferably is designed to lie 1 ½ inches below the top inside of the casing 15 of the tire 10. This dimension, though by no means critical, will insure that upon the tire reaching a deflated condition, the safety device will provide a means by which the vehicle may still be operated, without excess damage to either the tire 10 or rim 11, and further insuring that the vehicle can continue to operate in a relatively safe manner.

The safety device could, of course, be constructed of two segments and two bands, and it must be remembered that the foregoing specific embodiment has been described for the purpose of illustrating the principles of the present invention, and the same is subject to modification without departure therefrom. Therefore, the invention includes all modifications within the spirit and scope of the appended claims.

What is claimed is:

1. For use with a vehicle wheel rim and tire, a safety device mounting within said tire comprising:

a. at least two arcuate spacer segments; each of said spacer segments having two oppositely disposed ends, an inner and outer periphery and a recess opening located along the outer periphery intermediate of said ends; said spacer segments being placed end to end to extend in a common plane and having said inner peripheries adapted to be disposed against said rim;

b. at least two arcuate band members, each of said band members having two oppositely disposed ends, each of said band member ends having a portion extending radially inwardly; said band members being placed end to end around the outer peripheries of said spacer segments with said radially inwardly extending portions being disposed in said recesses;

c. fastening means disposed parallel to the plane of said segments and adapted to secure said portions of said band members together;

d. pin means for securing said spacer segment ends together; and e. additional pin means for securing said steel band segments to said spacer segments so that when said fastening means are secured, said band members will be disposed against said spacer segments, resulting in a tight frictional fit of said spacer segments against said rim.

2. The safety device of claim 1, wherein said arcuate spacer segments are constructed of wood, said band members are constructed of steel and said pin means and additional pin means are also constructed of steel.

3. The safety device of claim 2, wherein said fastening means comprises a nut and a bolt adapted to secure each of said portions disposed in said recesses.

4. For use with a vehicle wheel rim and tire, a safety device mounting within said tire comprising:
 a. four arcuate spacer segments; each of said spacer segments having two oppositely disposed ends, and inner and outer periphery and a recess opening located along the outer periphery intermediate of said ends; said spacer segments being placed end to end to extend in a common plane and having said inner peripheries adapted to be disposed against said rim;
 b. four arcuate band members, each of said band members having two oppositely disposed ends, each of said band member ends having a portion extending radially inwardly; said band members being placed end to end around the outer peripheries of said spacer segments with said radially inwardly extending portions being disposed in said recesses;
 c. fastening means disposed parallel to the plane of said segments and adapted to secure said portions of said band members together;
 d. pin means for securing said spacer segment ends together; and
 e. additional pin means for securing said steel band segments to said spacer segments so that when said fastening means are secured, said band members will be disposed against said spacer segments, resulting in a tight frictional fit of said spacer segments against said rim.

5. The safety device of claim 4, wherein said arcuate spacer segments are constructed of wood, said band members are constructed of steel and said pin means and additional pin means are also constructed of steel.

6. The safety device of claim 5, wherein said fastening means comprises a nut and a bolt adapted to secure each of said portions disposed in said recesses.

* * * * *